(12) United States Patent
Thieret

(10) Patent No.: US 6,952,283 B2
(45) Date of Patent: Oct. 4, 2005

(54) SAMPLING OF CUSTOMER IMAGES AS COLOR DATA FOR PROCESS CONTROL

(75) Inventor: Tracy E. Thieret, Webster, NY (US)

(73) Assignee: Xerox Corporation, Stamford, CT (US)

( * ) Notice: Subject to any disclaimer, the term of this patent is extended or adjusted under 35 U.S.C. 154(b) by 906 days.

(21) Appl. No.: 09/837,801

(22) Filed: Apr. 17, 2001

(65) Prior Publication Data

US 2002/0149787 A1 Oct. 17, 2002

(51) Int. Cl.$^7$ .......................... G06K 15/00; G06K 9/40
(52) U.S. Cl. ..................... 358/1.2; 358/3.26; 382/275
(58) Field of Search ............... 382/317, 112, 382/299, 275; 358/504, 412, 1.2, 2.1, 3.26, 530, 448, 451, 461, 406

(56) References Cited

U.S. PATENT DOCUMENTS

| | | | |
|---|---|---|---|
| 4,986,526 A | * | 1/1991 | Dastin .................. 271/227 |
| 5,180,932 A | * | 1/1993 | Bengel .................. 327/362 |
| 5,416,613 A | | 5/1995 | Rolleston et al. |
| 5,450,165 A | | 9/1995 | Henderson ............. 355/208 |
| 5,471,313 A | | 11/1995 | Thieret et al. .......... 358/296 |
| 5,543,896 A | | 8/1996 | Mestha ................. 355/208 |
| 5,689,350 A | | 11/1997 | Rolleston |
| 5,748,221 A | * | 5/1998 | Castelli et al. ......... 347/232 |
| 5,877,787 A | | 3/1999 | Edge |
| 6,023,351 A | | 2/2000 | Newman |
| 6,351,228 B1 | * | 2/2002 | Kutsuno et al. ......... 341/120 |
| 6,384,918 B1 | * | 5/2002 | Hubble et al. .......... 356/402 |
| 2001/0055255 A1 | * | 12/2001 | Ma et al. .............. 369/53.19 |
| 2002/0033454 A1 | * | 3/2002 | Cheng et al. .......... 250/339.12 |

FOREIGN PATENT DOCUMENTS

| | | | | |
|---|---|---|---|---|
| JP | 409207889 | * | 8/1997 | ......... B63H/25/04 |
| JP | 410019547 | * | 1/1998 | ......... G01B/21/08 |

* cited by examiner

Primary Examiner—Jerome Grant, II
(74) Attorney, Agent, or Firm—Oliff & Berridge, PLC

(57) ABSTRACT

A controls system and method of print quality control for a printing system. The controls system uses printed output images as a continuous source of data for control processes. An image quality detector is positioned to detect color data in a printed image after the image is fused to a copy sheet. The present invention samples a wide range of colors in the image in order to calibrate a process station and ensure accurate production of color and/or other image quality parameters. The image quality detector examines an output image and compares the appearance of output image to a desired appearance. When an error exists, the printing system adjusts a process station to correct for variations and inconsistencies in a printed image. The detector of the present invention moves to different locations as the image exits from the printing system to sample a range of image quality parameters in the image.

20 Claims, 4 Drawing Sheets

SAMPLING OF CUSTOMER IMAGES AS COLOR DATA FOR PROCESS CONTROL

TECHNICAL FIELD OF THE INVENTION

The present invention relates generally to a process control system and more particularly to a method of controlling the print quality of a printing system.

BACKGROUND OF THE INVENTION

In a color image forming process, image data corresponding to an input image is encoded in a color space of tristimulus values i.e. RGB (red, green, blue) or another input color space. Each combination of color values represents a unique color in the image, and each picture element ("pixel") in the image is represented by a combination of the primary colors of the input color space. To form and print a color output image associated with a color input image, a charged photoconductive imaging member may be sequentially exposed to a series of color separated images corresponding to the primary colors in an input image in order to form a plurality of color separated latent images. Each color separated image is developed with a complementary developing material (toner) containing a primary color or a colorant, such as cyan, magenta and yellow. The complementary developing material used to develop each color separated image is the subtractive complement of the respective color separated image. The developed color separated images are subsequently superimposed, in registration, on one another to produce a multicolor image output. Thus, a multicolor image is generated from patterns of different primary colors or their subtractive complements which are blended by the eye to create a visual perception of a color image.

Each color separated image produced by separating and superimposing color images comprises an arrangement of pixels corresponding to a spot to be developed with toner particles of a particular color. With half-toning, the multicolor image is a mosaic of different color pixels, wherein the color separations are laid down in the form of halftone dots. In halftone image processing, the dot densities of each of the color components making up the multicolor image can be altered to produce a large variation of color hues and shades. For example, lighter tints can be produced by reducing the dot densities such that a greater amount of white from the page surface remains uncovered to reflect light to the eye. Likewise, darker shades can be produced by increasing the dot densities. This method of generating process color images by overlapping halftones of different colors corresponding to the primary colors or their subtractive equivalents is well known in the art.

A printer which has an ideal dye behavior has a one-to-one correspondence of cyan-to-red, magenta-to-green, and yellow-to-blue. This means that when printed, the cyan ink will only absorb red light, the magenta ink will only absorb green light, and the yellow ink will only absorb blue light. However, inks typically have a non-ideal dye behavior and, therefore, have a complex non-linear colorimetric response because interactions between the cyan, magenta, and yellow inks exist which result in unwanted absorptions of reds, greens, and blues. Therefore, the amount of a complementary developing material, such as toner, used in forming an image is not always proportional to the level of the respective input color.

In pigment-based and dye-based applications, a Color Rendition Dictionary (CRD) is provided as a guide for mixing colorants to achieve a desired target color. The CRD comprises a multi-dimensional look-up table reflecting the gamut or possible range of colors that can be made by combining the primary colors. Each of the three axes of the table defines a respective primary color. For example, for an RGB color space, the entry having coordinates (255, 0, 0) corresponds to fully saturated red, similarly (0, 255, 0) corresponds to green, and (0, 0, 255) corresponds to blue. The entry (0, 0, 0) corresponds to pure black and the entry (255, 255, 255) corresponds to pure white, with a range of color combinations in between. Each entry of the CRD contains a formula or "recipe" for creating the particular color defined by the coordinates of the entry. The formula specifies the relative amounts of primary colorants, typically but not restricted to Cyan, Magenta, Yellow, and Black to mix in order to create a desired color. The Color Rendition Dictionary is incorporated in an image processor, such as a Digital Front End (DFE). The DFE receives input image data and converts the image data to a pixel image so that the printing system may produce a "hardcopy" of the image. The CRD instructs the printing system to produce a specified amount of each respective complementary developer material to create the desired colors in the output image.

Even after a Color Rendition Dictionary is formed in the memory of a printing system, the relationship between the input colors and the toner combination used to print the color may drift over time. This is due to the tendency of the pigments of the toner to vary and change. Therefore, after a printer is calibrated, a formula for creating a color that comprises an entry of the CRD may not accurately produce the correct color. In other words, the colors asked to be printed and the actual colors printed are not the same. Periodic recalibration of the color mixing process to ensure accurate reproduction of color is necessary in certain color image forming processes, particularly where a very specific customer selectable color is required for trademarks, logos and the like. As such, the customer is usually highly concerned that the color meets particular color specifications.

In copying or printing systems, such as a xerographic copier, laser printer, or ink-jet printer, a common technique for monitoring the quality of prints is to artificially create a "test patch" of a predetermined desired density. Data for process controls algorithms are typically obtained by reading test patches on the photoreceptive imaging member, usually in the interdocument zone (IDZ). The interdocument zone comprises a portion of the photoreceptive imaging member that is not used to form an output image. The actual density of the developer material in the test patch can then be optically measured to determine the effectiveness of the printing process.

For example, U.S. Pat. No. 5,543,896 discloses a method for measurement of tone reproduction curves using a single structured patch for providing development control by storing a reference tone reproduction curve and providing a single test pattern including a scale of pixel values in an interdocument zone on a photoreceptor surface. The test pattern is sensed in the interdocument zone and a control response to the sensing of the test pattern is provided with reference to the tone reproduction curve in order to adjust the machine operation for print quality correction.

U.S. Pat. No. 5,450,165 to Henderson et al discloses a system for identifying areas in pre-existing image data as test patches for print quality measurement. The system described therein is used to screen for printing data consistent with an area in a visible image having predetermined density condition. These "incidental" test patches comprise a portion of the developed image on the photoconductive imaging member or on the output media.

U.S. Pat. No. 5,471,313 to Thieret et al., uses a control system for an image output terminal with a hierarchical structure which isolates subsystem controls for purposes of efficient algorithm design, analysis and implementation. The architecture is divided into three levels and has a controls supervisor which provides subsystem isolation functions and reliability assurance functions.

While the controls systems of the prior art have been effective in monitoring and controlling single color separations, these control systems are inadequate for monitoring other print quality factors, such as color mixing. The interdocument zone in a printing system is inadequate for a controls system designed to stabilize a color mixing process. To provide effective control, information for the range of colors output by a printing system must be obtained. There is inadequate space in the IDZ to provide the large amount of color data that is required. Moreover, test patches created and measured on the photoconductive imaging member, both in the IDZ and within the image data, do not acknowledge contributions to color made by media, transfer and fusing systems.

Prior controls systems for a color mixing process involve complicated and time-consuming external processes to calibrate and control the color printing process. In addition to wasting customer consumables, such as toner and paper, these external processes significantly reduce the productivity of a printing system, as the printing system is unusable for creating images during the calibration process.

SUMMARY OF THE INVENTION

The present invention utilizes printed output images as a continuous source of data for control processes. In one embodiment of the present invention, an image quality detector, such as a spectrophotometer is positioned to detect color data in a printed image after the image is fused to a copy sheet. This embodiment samples a wide range of colors in the image in order to calibrate a Color Rendition Dictionary and ensure accurate production of color and/or other image quality parameters. The image quality detector examines an output image and compares the appearance of output image to a desired appearance. When an error exists, the printing system adjusts a process station, such as the color mixing formula in a Color Rendition Dictionary, to correct for variations and inconsistencies in a printed image.

According to one embodiment, the detector of the present invention moves to different locations as the image exits from the printing system to sample a range of colors. In this manner, the control system particularly focuses on colors often used in a specific document.

According to another embodiment, the present invention provides a method of calibrating a printing system comprising printing an output image on a support sheet, detecting an image quality parameter within a predetermined area of the fused image and controlling a process station in the printing system as a function of the image quality parameter.

According to yet another embodiment, the present invention provides a process control system comprising an image forming system for forming a developed image, a support sheet for receiving the developed image wherein the developed image is fused to the support sheet to form a fused image and an image quality sensor for measuring an image quality parameter of the fused image on the support sheet and generating a signal representative of said image quality parameter.

According to an alternate embodiment, the present invention provides a process control system for calibrating a printing system suitable for forming an output image representative of an input image comprising a movable image quality sensor for measuring an image quality parameter in an image.

DETAILED DESCRIPTION OF AN ILLUSTRATIVE EMBODIMENT

Figure 1:
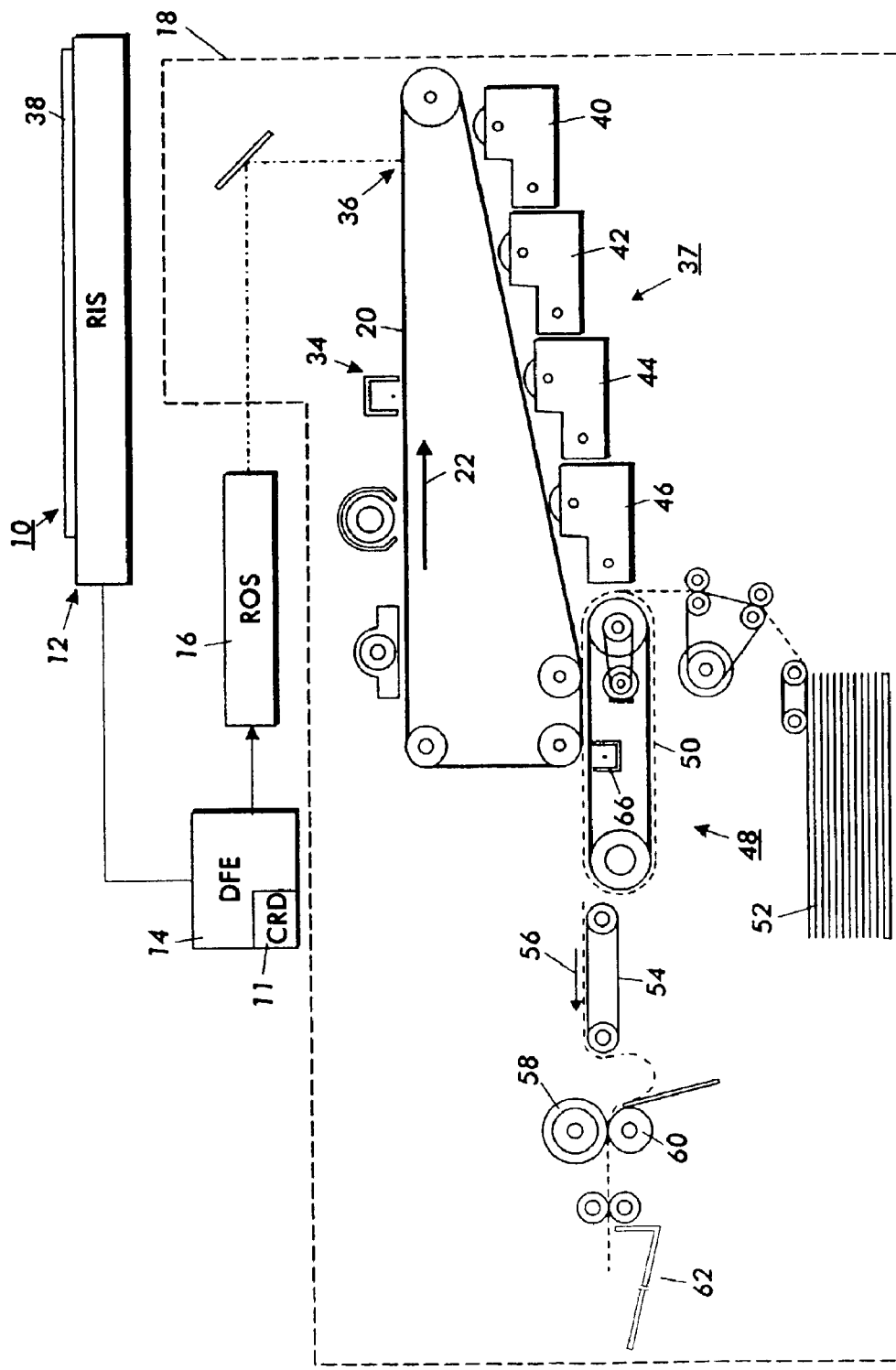
FIG. 1 is a schematic view showing an image forming and a printing system suitable for implementing an illustrative embodiment of the present invention.

For a general understanding of the features of the present invention, reference is made to the drawings. In the drawings, like reference numerals have been used throughout to designate identical elements. FIG. 1 is a schematic elevational view illustrating a printing system incorporating the features of the present invention therein. It will become apparent from the following discussion that the apparatus of the present invention may be equally well suited for use in a wide variety of printing, copying, or fax machines and is not necessarily limited in its application to the particular embodiment.

The illustrative embodiment of the present invention provides a print quality controls system for verifying the accuracy of a printing process. The illustrated embodiment of the present invention includes an image quality detector positioned to examine an output image as the image exits from a printing system. The illustrative embodiment allows calibration of a printing system to be performed concurrently with standard printing processes, without interrupting the system's operation.

In FIG. 1, during operation of the color marking system 10, a multicolor original document 38 is positioned on a raster input scanner (RIS) 12. RIS 12 contains document illumination lamps, optics, and a mechanical scanning drive and a charge coupled device (CCD array). RIS 12 captures the entire original document and converts the document to a series of raster scan lines and measures a set of primary color densities, i.e., red, green and blue densities, at each of the original documents. This information is transmitted to an image processing system, illustrated as Digital Front End (DFE) 14. DFE 14 comprises the control electronics which prepare and manage the image data flow to the raster output scanner (ROS) 16. The DFE receives image data in an initial input format and converts the image data into a pixel image in a format that is compatible with a laser to construct a copy of the image. A signal corresponding to the desired image is transmitted from DFE 14 to ROS 16 which creates the output copy image. ROS 16 lays out the image in a series of horizontal scan lines with each line having a specific number of pixels per inch. ROS 16 includes a laser with a rotating polygon mirror block. ROS 16 exposes the charged photoconductive surface of printer 10 to achieve a set of subtractive primary latent images. The latent images are developed with cyan, magenta, yellow and black developer material, respectively. These developed images are transferred to a copy sheet and superimposed in registration with one another to form a multicolored image on the copy sheet. This multicolored image is then fused to the copy sheet forming a color copy.

With continued reference to FIG. 1, printer or marking engine 18 is an electrophotographic printing machine. The electrophotographic printing machine employs a photoreceptor or photoconductive imaging member, illustrated as belt 20. Belt 20 moves in the direction of arrow 22 to advance successive portions of the photoconductive surface sequentially through the various processing stations disposed about the path of movement.

Initially, a portion of photoconductive belt 20 passes through a charging station 34. At charging station 34, corona generating devices or a scorotron charge photoconductive belt 20 to a relatively high substantially uniform potential.

Next, the charged photoconductive surface of belt 20 is moved to the exposure station 36. Exposure station 36 receives image information from RIS 12 having a multicolored original document 38 positioned thereon. RIS 12 captures the entire image from the original document 38 and converts it to a series of raster scan lines which are transmitted as electrical signals to DFE 14. The electrical signals from RIS 12 correspond to the red, green and blue densities at each point in the document. DFE 14 converts the set of red, green and blue density signals, i.e. the set of signals corresponding to the primary color densities of original document 38, to a set of calorimetric coordinates using a Color Rendition Dictionary (CRD) 11. The color conversion process is analogous to "paint mixing" in a paint store. The Color Rendition Dictionary 11 provides a recipe for producing a desired color by mixing specified amounts of different developer materials. DFE 14 then transmits signals corresponding to the desired image to ROS 16. ROS 16 includes a laser with rotating polygon mirror blocks. ROS 16 emits a beam which illuminates the charged portion of photoconductive belt 20 at a rate of typically 300 to 1200 pixels per inch. ROS 16 exposes the photoconductive belt to record four latent images. For the customary four color (CMYK) process, one latent image is adapted to be developed with cyan developer material. Another latent image is adapted to be developed with magenta developer material with the third latent image adapted to be developed with yellow developer material and the fourth with black material. The latent image is formed by ROS 16 on the photoconductive belt corresponding to the signals from DFE 14.

After the electrostatic latent image has been recorded on photoconductive belt 20, belt 20 advances the electrostatic image thereon to the development station 37. The development station includes four individual developer units 40, 42, 44 and 46 which develop the electrostatic latent images using toner particles of appropriate color as is conventional.

After development, the toner is moved to the transfer station 48 where the toner image is transferred to a sheet of support material 52, such as plain paper. At transfer station 48, the sheet transport apparatus comprising a sheet conveyor 50 moves the sheet into contact with photoconductive belt 20. At transfer station 48, a scorotron 66 sprays ions onto the backside of the sheet to charge the sheet to proper magnitude and polarity for attracting the toner image from photoconductive belt 20. In this way, the four color toner images are transferred to the sheet in superimposed registration with one another. After the sheet is fed around sheet conveyor 50 four times, the sheet is then released and fed to a sheet transport 54 in the direction of arrow 56 between fuser roll 58 and pressure roll 60 and then is deposited in an output tray 62.

Alternatively, the image to be printed can originate from another image-generating device, such as a workstation or the Internet. In this case, image data arrives at the DFE 14 in the form of a representation in a postscript language, such as PDL. The DFE 14 decomposes each page of the input image to convert the image data into a pixel image and transmits the converted signals to ROS 16 which creates an output copy of the image. The color mixing process provided by the CRD, the formation of the latent image, development and fusion of the image are similar to the process illustrated in FIG. 1.

The idea of "print quality" can be quantified in a number of ways. In the present invention, print quality is measured by comparing the appearance and properties of a printed output image with the desired or specified appearance and properties of the input image. For example, one measurement of print quality is obtained by comparing the actual colors in a printed image with the colors that were intended to be printed. Another indication is the glossiness of an output image in comparison with the designed glossiness of the image. A high quality image is one that accurately reproduces an input image. A process station determines print quality in the printing system. A process station includes any station or subsystem that has a direct and controllable bearing on the print quality.

Figure 2:
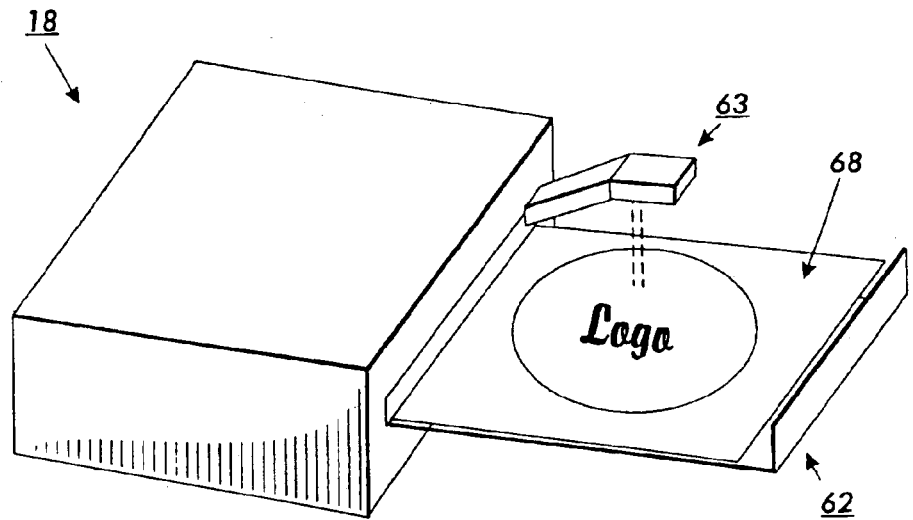
FIG. 2 illustrates a print quality detector arranged to detect a print quality parameter in a printed image.

After a customer document exits from the fusing system, an image quality detector, illustrated in FIG. 2 as spectrophotometer 63, examines the printed document 68 containing the output image. Spectrophotometers are devices that measure light in terms of its intensity at a number of wavelengths. The received light is decomposed into a spectrum, and particular wavelengths are recorded by corresponding photodiodes, photomultiplier arrays, etc. In other words, the spectrophotometer 63 measures the color coordinates within the detected area of the printed document 68. While the illustrated embodiment of the present invention shows a spectrophotometer for determining the color reproduction quality of an image, it will be understood that other sensors may be used. Image quality parameters such as registration, halftone characteristics, line width, image gloss and other properties may be detected by the appropriate sensors.

Figure 3:
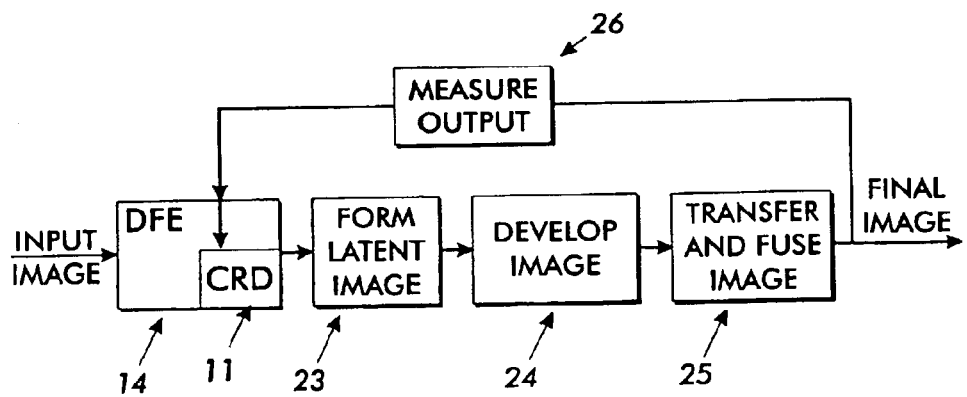
FIG. 3 illustrates a feedback control loop according to the illustrative embodiment of the present invention.

As illustrated in FIG. 3, the spectrophotometer participates in a feedback control loop designed to stabilize the color marking process. The input image is processed and converted by the DFE 14, the image signal is then used to form a latent image (step 23), develop the image (step 24), and transfer and fuse the image to a copy sheet (step 25). The spectrophotometer measured the final output of the system (step 26). Once a color in a printed image is determined, the measured color is compared to a known value provided by the DFE corresponding to a desired output color. The difference between the color pattern in the output image (e.g., what was actually printed) and the optimal color pattern (e.g., what should have been printed) produces an error signal. The error signal forms the basis of adjustment values used for modifying the color formulas registered in the CRD process station to compensate for variations and inconsistencies in the output image.

All portions of the printed image that pass under the spectrophotometer 63 are examined for their color coordinates. The sensor aperture is a few millimeters in dimension and samples a color mixture for a plurality of halftone cells collectively. Thus, the sensor value represents a single reading for what may be a complicated pattern of colors in the sensor aperture. The sensor value is compared with the desired value provided by the DFE to calculate and generate an error signal if the values differ. The error signal is characteristic of a particular distribution of halftone values for each of the primary colors, and may be interpreted by the control algorithm to assign corrections to each of the contributing colors.

Figure 4:
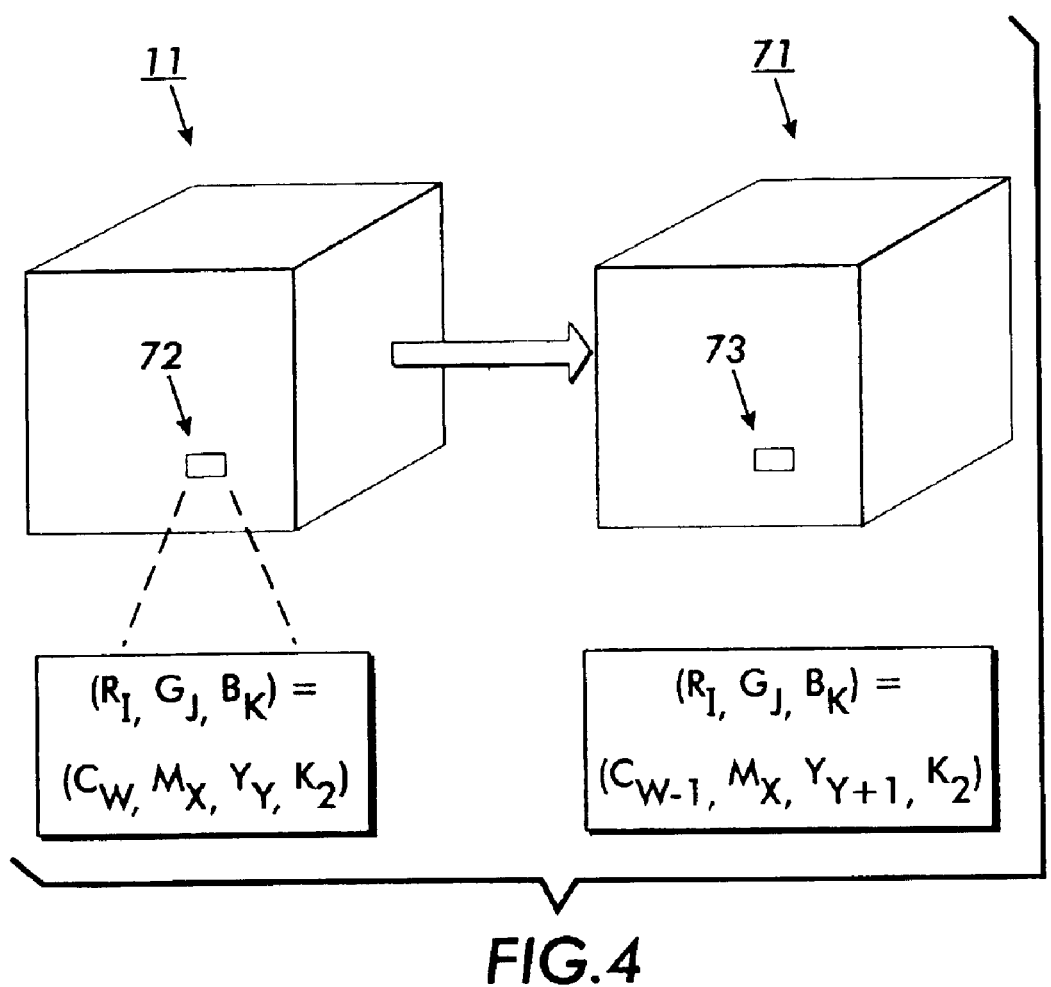
FIG. 4 illustrates a reconstruction of a Color Rendition Dictionary process station according to an illustrated embodiment of the present invention.

As illustrated in FIG. 4, a CRD 11 uses the error signal for a particular printed color to adjust the toner formula for the specified color. To determine how to adjust the toner formula recipe, the relative proportions of the constituent colors must be estimated. By measuring the spectra of the color mixture, the proportions, e.g., the halftone densities, weight percents or volume percents, of the constituent colors are ascertained. The required adjustment to the output color is then made by selectively adjusting the proportions of the constituent toner color(s). For example, if the error signal indicates that excess cyan developer material density is used in a printed color $(R_I, G_J, B_K)$, the entry 72 of the CRD 11 corresponding to $(R_I, G_J, B_K)$ is modified to reduce the relative proportion of cyan developer material density in the color mixing formula.

The error signals may be used to adjust a number of entries in the CRD incrementally, or to reconstruct an entirely new calibrated CRD 71. Each detected color combination is used to produce a new entry 73 of the new CRD 71, where each new entry contains an accurate color mixing formula. The process of detecting color combinations and constructing precise entries of the CRD is repeated until the new calibrated CRD is complete. The new CRD is held in memory during construction and replaces the old CRD at an opportune time. As the new CRD may comprise different color mixing formulas, it is preferable that the new CRD replaces the old CRD between print jobs, so that colors are consistent throughout a given print job.

Figure 5:
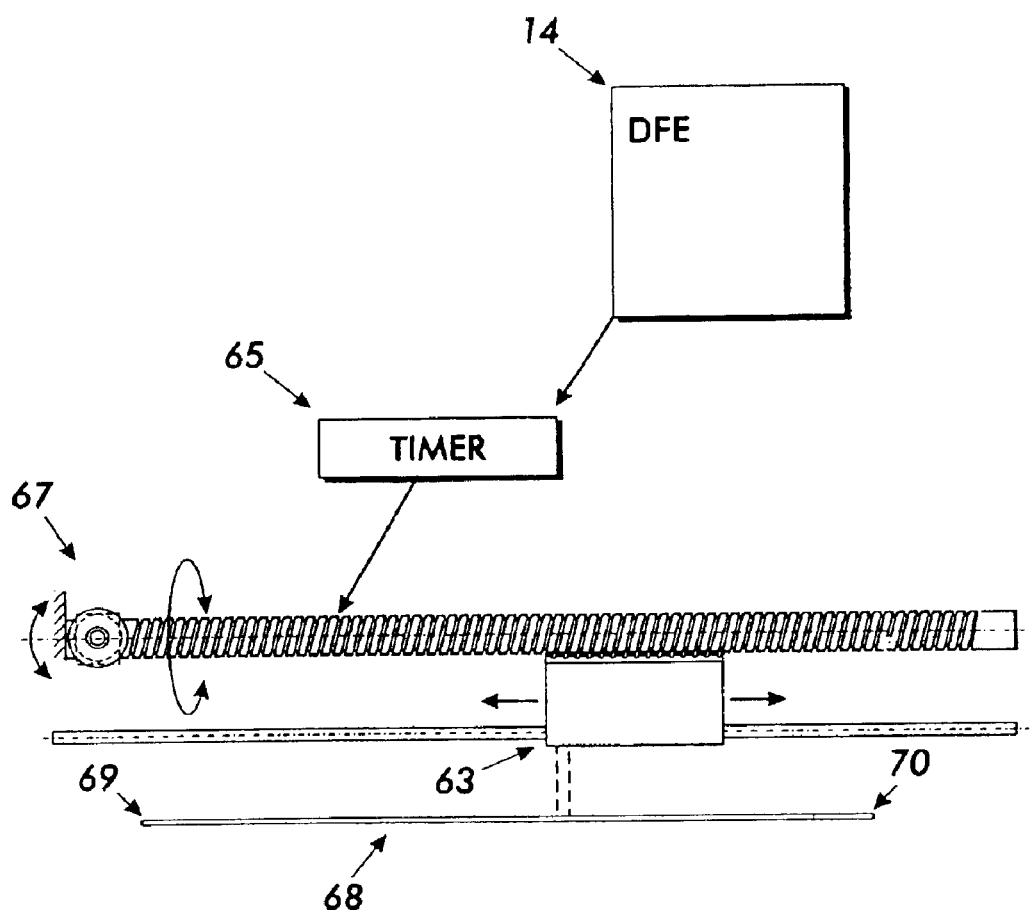
FIG. 5 illustrates a movable print quality detector of the illustrative embodiment of present invention.

In order to sample a wide variety of data in the customer document, the image quality detector may be actively positioned across a process direction as the document exits from the printing system. As illustrated in FIG. 5, the spectrophotometer 63 is mounted on a movable carriage to maximize the ability of the control system to examine and verify a range of colors in the output image 68. The spectrophotometer moves between the inboard edge 69 and the outboard edge 70 of the image in response to a signal from the DFE 14 that "interesting" data for sensing is available at a particular location. The choices of data to be examined may be based on any number of conditions, and is not limited to a single halftone pattern. In this manner, it is possible to particularly focus on the accuracy and stabilization of regions of color that are actually printed by the user. In addition, the DFE 14 is capable of planning out a trajectory for the spectrophotometer 63 that sweeps out a linear path through the image area of the document 68 as it passes underneath. A timer 65 is provided to coordinate the positioning of the spectrophotometer 63 above a particular location in the document with the appearance of the document 68 in the output tray. As image data is processed by the DFE, certain portions of the image data are identified for evaluation. The identified portions may be colors that tend to be repeated by a particular printing system, or certain colors required in the construction of a CRD. The DFE, in cooperation with timer 65, directs a motion-transmitting mechanism, illustrated as worm gear 67, to position the spectrophotometer prior to the appearance of the document in the output tray.

In the illustrated embodiment of FIG. 5, the spectrophotometer is mounted on a worm gear 67. However, any device capable of imparting a controlled motion to the spectrophotometer may be used. Suitable devices for the motion-transmitting mechanism include an electrical motor, gears or any other device capable of moving, shifting, or translating an image quality detector when directed by a controller, such as the DFE.

The present invention may be implemented in combination with known systems and methods of monitoring a print quality and controlling printing process. For example, the present invention may be combined with the hierarchical controls process described in U.S. Pat. No. 5,471,313, the contents of which are herein incorporated by reference. The hierarchical controls process described in U.S. Pat. No. 5,471,313 relates to Level 1, 2, and 3 process control, while the present invention relates to Level 4 process control, which may supplement the process control systems of Levels 1, 2 and 3 to ensure accurate color formulation in a printed image.

In addition, the method of measuring print quality by using printed customer images of the present invention may be combined with an artificial test patch approach. For example, if certain colors are not found in printed documents, the system can artificially create test patches having the desired colors to measure and calibrate the color mixing process. These artificial test patches may be periodically created, printed on paper and tested accordingly by the spectrophotometer. In this manner, the present invention ensures that a wide range of color values may be calibrated, even when customer documents contain a limited range of colors.

While the illustrated embodiment of the present invention has been described in terms of stabilization of a color mixing process (Level 4 control) it is understood that the present invention is not limited to controlling color only. Alternatively, or in addition, the arrangement described in the present invention can be applied to control the application of gloss or to control another factor indicative of print quality. For example, the present invention can comprise a gloss-meter for measuring the amount of gloss in a printed image. The reading from the gloss-meter may be used to adjust a process station that determines how much gloss to apply to the image. Furthermore, the gloss-meter may be mounted on a movable platform in order to sample a variety of readings in the final image. Other image quality parameters such as registration, halftone characteristics, line width, and other properties may be detected by the appropriate sensors and incorporated into an appropriately designed control system to stabilize image quality.

The present invention takes advantage of varying information in printed documents as a source of print quality control. The control system of the present invention detects variations in the printed colors of a printing system in real time, as the printed documents exit the printing system. In this manner, the process stations of the printing system can be fine-tuned on the fly, without interrupting a machine's operation. Thus, the printer can be maintained in constant calibration. As the printing system continues normal printing operations during recalibration, this approach significantly increases the productivity of a printing system by reducing the amount of time that a printing system is inoperable.

An additional benefit of the use of customer documents as a source of print quality control is an enhanced capability for verifying a printer output. Rather than examining single color separations, the present invention samples and verifies a wide range of color combinations. The control system can focus on the calibration of specific colors that tend to be used by a particular printing system. The present invention provides a more accurate control system for calibrating a printing system, particularly for a color mixing process.

Furthermore, the control system of the present invention does not necessitate use of an interdocument zone for providing image data. The ability to use customer documents as a source of data for print quality control is particularly beneficial for web machines, where no interdocument zone exists, or in other marking processes where all the written images appear on the output media. In addition, cost savings are realized during print quality controls process of the present invention, in that no toner, paper or other consumables are wasted. The present invention makes efficient use of available resources while ensuring that a high quality image is produces by a printing system at all times.

While the present invention has been described with reference to particular embodiments, the present invention is not limited to only the illustrated embodiments. It should be understood that the foregoing description of the invention is intended to be merely illustrative thereof, that the illustrative embodiments are presented by way of example only, and that other modifications, embodiments, and equivalents may be apparent to those skilled in the art without departing from the spirit and scope of the invention.

What is claimed is:

1. A method of calibrating a printing system suitable for forming an output image representative of an input image, the method comprising:

forming and printing an output image on a support sheet;

detecting an image quality parameter within a predetermined area of the output image;

comparing the image quality parameter with an input parameter to determine an error adjustment;

adjusting the image quality parameter based on the error adjustment; and automatically controlling a process station in the printing system as a function of the image quality parameter determined in the detecting step and adjusted in the adjusting step.

2. The method of claim 1, wherein the image quality parameter comprises the color coordinates of the output image.

3. The method of claim 2, wherein the color coordinates in the output image are detected using a spectrophotometer.

4. The method of claim 3, wherein the spectrophotometer senses a range of color coordinates in the output image.

5. The method of claim 1, wherein the process station comprises a look-up table for determining a color toner formula.

6. The method of claim 5, wherein the step of controlling includes modifying an entry of the look-up table.

7. The method of claim 1, wherein the step of forming an output image further comprises selecting a predetermined area to be detected.

8. The method of claim 7, further comprising a step of moving a sensor to the predetermined area of the output image.

9. The method of claim 1, wherein the input parameter is a proportion of constituent color spectra, and the error adjustment affects the proportion of the spectra of the image quality parameter.

10. A process control system for calibrating a printing system, comprising:

an image forming system for forming a developed image based on an input quality parameter;

a support sheet for receiving the developed image to form an output image representative of an output image;

an image quality sensor for measuring an output quality parameter of the output image on the support sheet and generating a signal representative of the image quality parameter in response to a comparison between the output quality parameter and the input quality parameter.

11. The system of claim 10, further comprising an image controller for calibrating a process station as a function of the signal generated by the image quality sensor, the image controller adjusting the image forming system based on the comparison.

12. The system of claim 11, wherein the sensor comprises a spectrophotometer for measuring color coordinates in the output image.

13. The system of claim 12, wherein the process station comprises a look-up table for determining a color toner formula.

14. The system of claim 13, wherein the controller modifies an entry of the look-up table to comprise a new color toner formula.

15. The system of claim 11, wherein the sensor is movable along a predetermined path.

16. The system of claim 15, wherein the image controller directs the sensor to a plurality of positions along the predetermined path so as to measure a range of image quality parameters.

17. A process control system for calibrating a printing system suitable for forming an output image representative of an input image, comprising:

a movable image quality sensor for measuring an output image quality parameter in an image and generating a signal representative of the output image quality parameter in response to a comparison between the output image quality parameter and an input image quality parameter.

18. The process control system of claim 17, further comprising an image processor for decomposing an input image and producing output data for rendering an output image by a print engine.

19. The process control system of claim 18, wherein the image processor controls the movement of the sensor.

20. The system of claim 19, wherein the image processor moves the sensor along a predetermined path so as to determine a range of color coordinates in the output image.

* * * * *